United States Patent [19]

Yanagawa

[11] Patent Number: 4,717,939

[45] Date of Patent: Jan. 5, 1988

[54] SLIT-SCANNING TYPE IMAGE EXPOSING SYSTEM

[76] Inventor: Nobuyuki Yanagawa, 4-15-16, Nakakaigan, Chigasaki-shi, Kanagawa-ken, Japan

[21] Appl. No.: 763,760

[22] Filed: Aug. 7, 1985

Related U.S. Application Data

[63] Continuation of Ser. No. 461,740, Jan. 28, 1983, abandoned.

[30] Foreign Application Priority Data

Feb. 2, 1982 [JP] Japan ................................ 57-14660
Feb. 5, 1982 [JP] Japan ................................ 57-17043

[51] Int. Cl.⁴ .................. G03B 27/48; G03B 27/50
[52] U.S. Cl. ................................ 355/50; 355/51; 355/68; 355/71
[58] Field of Search .................... 355/50, 51, 71, 8, 68

[56] References Cited

U.S. PATENT DOCUMENTS

| | | | |
|---|---|---|---|
| 3,535,036 | 10/1970 | Starkweather | 355/8 X |
| 3,535,038 | 10/1970 | Stievenart et al. | 355/27 |
| 3,869,204 | 3/1975 | Wilby | 355/8 X |
| 4,113,373 | 9/1978 | Eppe et al. | 355/71 X |
| 4,171,905 | 10/1979 | Boschet | 355/71 |
| 4,279,497 | 7/1981 | Satomi | 355/51 X |
| 4,291,973 | 9/1981 | Brooke | 355/51 X |
| 4,362,382 | 12/1982 | Simpson | 355/8 X |
| 4,373,803 | 2/1983 | Shogren | 355/8 X |
| 4,419,008 | 12/1983 | Nishimoto | 355/71 X |

Primary Examiner—L. T. Hix
Assistant Examiner—D. Rutledge

[57] ABSTRACT

A slit-scanning type image exposing system for slit-exposing an original image to a photosensitive member which is being moved in a predetermined direction at constant speed, includes a lens and a light source which are moved in a first direction during exposure mode and in a second direction opposite to the first direction during returning mode. In one form of the present invention, an exposure control unit is provided in the region where the light path from the original image to the photosensitive member through the lens is virtually fixed in space. In another form, a shutter member is provided movably between the advanced position where the light path is blocked and the retracted position located away from the light path.

9 Claims, 14 Drawing Figures

SLIT-SCANNING TYPE IMAGE EXPOSING SYSTEM

This is a continuation of application Ser. No. 461,740 filed Jan. 28, 1983, now abandoned.

BACKGROUND OF THE INVENTION

1. Field of the Invention

This invention relates to an image exposing system for exposing an original image to an image forming surface, and, in particular, to a slit-scanning type image exposing system particularly suited to be used for slit-exposing an original image to a uniformly charged photosensitive member to form an electrostatic latent image corresponding to the original image thereon by selectively dissipating the charges.

2. Description of the Prior Art

A slit-exposing system for exposing a stationarily held original to a photosensitive member, which is being moved in a predetermined direciton, through an exposure optical system having movable parts by slit-scanning the original thereby moving the projected position in the direction opposite to that of the photosensitive member is known as described in the Japanese Patent Application No. 56-84182, which has been assigned to the assignee of the instant application.

Such a slit-exposing system will be briefly described hereinbelow with reference to FIG. 1. As shown, an original document 0 is stationarily placed on a transparent platen ( not shown ), under which a photosensitive member 2, which may be either in the form of a sheet or in the form of a belt, is moving to the left as indicated by the arrow at constant speed. Interposed between the original 0 and the photosensitive member 2 is an exposure optical system including movable lens 1 and a lamp 3. The two extreme positions of the lens 1 and the lamp 3 are indicated by the solid and dotted lines, between which the lens 1 and the lamp 3 may move in a reciprocating manner. When slitting-scanning the original 0, the lens 1 and the lamp 3 move from their respective positions indicated by the solid lines to the positions indicated by the dotted lines at constant speed. Then, upon completion of slit-scanning, or exposure, they return to their initial positions to be ready for the next operation.

At the initiation of a slit-scanning operation, since the lens 1 and the lamp 3 take the position indicated by the solid line, that portion of the original image 0 which is present at a slit-scanning start position A is focused onto an exposure start position A' on the photosensitive member 2. On the other hand, at the time of completion of the slit-exposure operation, the lens 1 and the lamp 3 each take the position indicated by the dotted line, so that that portion of the original 0 which is present at a slit-scanning termination position B is focused onto an exposure termination position B'. One of the features of this exposure system resides in the separation in position between the exposure start and termination positions with the exposure start position A' defined downstream of the exposure termination position B' with respect to the moving direction of the photosensitive member 2, whereby, during the slit-exposure operation, the position of projection of that part of the original 0 which is slit-scanned moves in the direction from the position A' to the position B', i.e., in the direction opposite to the moving direction of the photosensitive member 2, at constant speed.

As shown in FIG. 1, denoting the slit-scanning length by 1, the distance between the exposure start and termination positions A' and B' by L, the magnification rate by m, and the speed of the lamp during slit-exposure operation by v, then, in order to carry out the above described slit-exposure properly, the lens 1 and the photosensitive member 2 must be moved at the following speeds $v_L$ and $v_S$, respectively.

$$V_L = (ml - 1)/(1 + m))(1/1)v$$

$$V_S = ((m1 - L)/1)v$$

At the time of completion of the slit-exposure operation, the trailing end of the latent image thus formed is located at the position B', so that by having the lens 1 and the lamp 3 returned to their original positions indicated by the solid lines during the time period in which the trailing end of the latent image formed on the photosensitive member 2 reaches the position A', the next exposing operation may be started to form another latent image in contiguous with the trailing end of the last preceding latent image. This is advantageous because latent images may be formed on the photosensitive member 2 successively without a gap between the images.

However, in carrying out slit-exposure, in general, it is often times required to apply some measure for eliminating the effect of stray light and to provide an exposure amount control unit, such as a slit plate which is provided with a slit of a predetermined size extending in the direction perpendicular to the moving direction of the photosensitive member 2, for controlling the amount of exposure light to be uniform across the image forming area where a slit-scanned portion of the orignal image is focused. In the case of an exposure system such as the one shown in FIG. 2, a slit plate 4 may be movably provided in the vicinity of the orignal 0, or, alternatively, a slit plate 5 may be movably provided in the vicinity of the photosensitive member 2. In either case, however, the slit plate 4 or 5 must be moved in synchronism with the slit-exposure operation, and thus the provision of a driving source therefor is required, which then tends to make the entire system complex in structure and bulky.

SUMMARY OF THE INVENTION

The disadvantages of the prior art are overcome with the present invention and an improved slit-exposing system is provided. In accordance with one aspect of the present invention, there is provided an exposing system for slit-exposing an original image to a photosensitive member, which is being moved in a predetermined direction with respect to said original image at constant speed, said system comprising: an exposure optical unit including a lens and a light source, said lens and light source being provided reciprocatingly movably between respective first and second positions and said lens and light source being so moved that the slit-scanned image portion formed on said photosensitive member moves in the direction opposite to the moving direction of said photosensitive member during slit-exposure operation; and an exposure amount control unit for controlling the passage of light from said original image to said photosensitive member through said exposure optical unit, said exposure amount control unit being disposed in the region where the light path defined between said original image and the photosensitive member through said exposure optical unit is virtually constant in position.

In accordance with another aspect of the present invention, there is provided an exposing system for slit-exposing an original image to a photosensitive member, which is being moved in a predetermined direction with respect to said original image at constant speed, said system comprising: an exposure optical unit including a lens and a light source, said lens and light source being provided reciprocatingly movably between respective first and second positions and said lens and light source being so moved that the slit-scanned image portion formed on said photosensitive member moves in the direction opposite to the moving direction of said photosensitive member during slit-exposure operation; and shutter means for temporarily closing the light path defined between said original image and said photosensitive member through said exposure optical unit while said lens and said light source return to their original positions upon completion of slit-exposure operation.

Therefore, it is a primary object of the present invention to provide an improved slit-scanning type image exposing system.

Another object of the present invention is to provide an exposure system which may be advantageously applied to an electrophotographic copying machine and the like.

A further object of the present invention is to provide a slit-scanning type image exposing system in which a stationarily held original image is lit-exposed to a uniformly charged photosensitive member which is moved with respect to the original image thereby forming an electrostatic latent image of the original image on the photosensitive member.

A still further object of the present invention is to provide a slit-scanning type image exposing system which is reliable in operation and high in performance.

A still further object of the present invention is to provide a slit-scanning type image exposing system which does not suffer from stray light.

Other objects, advantages and novel features of the present invention will become apparent from the following detailed description of the invention when considered in conjunction with the accompanying drawings.

DESCRIPTION OF THE PREFERRED EMBODIMENTS

Figures 1, 2:
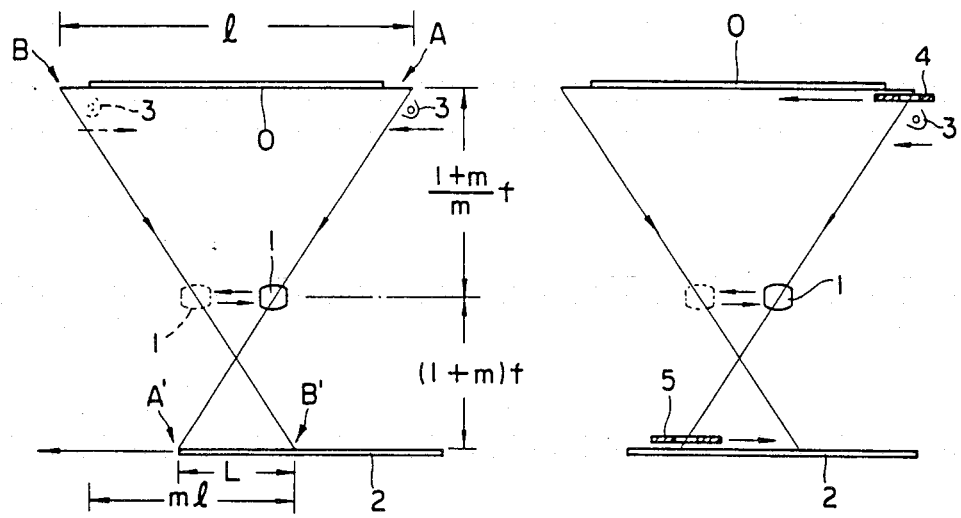
FIG. 1 is a schematic illustration showing the structure of a prior art slit-scanning type image exposing system.
FIG. 2 is a schematic illustration showing two alternative possible manners of providing an exposure amount control unit in the image exposing system of FIG. 1.
Figure 3:
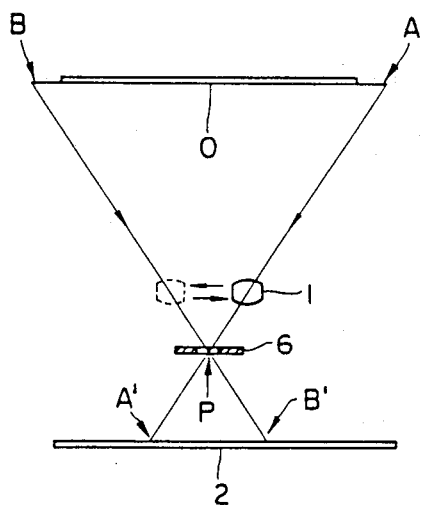
FIG. 3 is a schematic illustration showing the slit-scanning type image exposing system embodying the present invention.

Referring now to FIG. 3, showing one embodiment of the present slit-scanning type image exposing system, since the structure shown in FIG. 3 is virtually identical to that shown in FIG. 1 excepting that an exposure control unit 6 is additionally provided, like elements are indicated by like reference characters and the description with respect thereto is omitted. As shown in FIG. 3, a merging point P defined between the light path A-A' and the other light path B-B' is fixed in space and it does not shift in position even if the lens 1 and the lamp 3 ( not shown in FIG. 3 ) of the exposure optical unit move between their original positions aligned with the light path A-A' and their advanced positions aligned with the light path B-B'. With the foregoing in mind, the exposure control unit 6 is so disposed with its optical axis or center of the slit located at the merging point P in the system of FIG. 3. This arrangement is advantageous because the exposure control unit 6 may be provided fixedly in space and it does not need a driving mechanism for movement in association with the other moving parts of the system. The exposure control unit 6 may have any structure capable of controlling the amount of exposure light passing therethrough and preventing stray light from reaching the photosensitive member 2, which is obvious for those skilled in the art. One such example is an elongate plate provided with a slit of defined shape.

Figure 4:
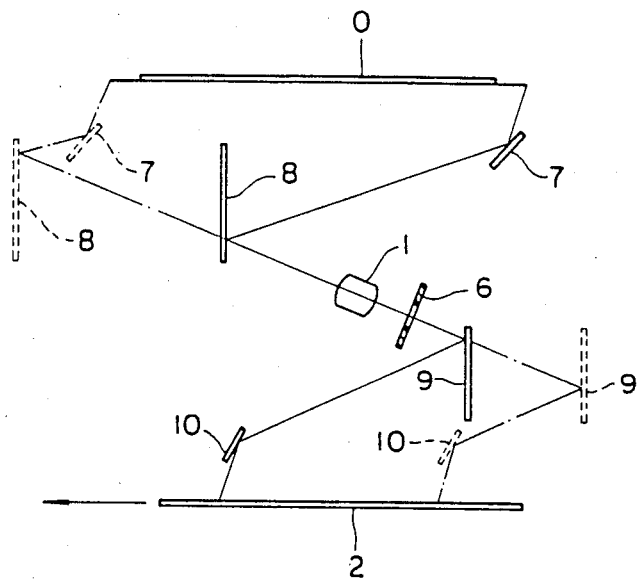
FIG. 4 is a schematic illustration showing another embodiment of the present slit-scanning type image exposing system.

FIG. 4 shows the case when the present invention is applied to another exposure optical unit. As practiced throughout the present specification, like numerals are used to indicate like elements to avoid repeated description of the same elements. The exposure optical unit interposed between the original image 0 and the travelling photosensitive member 2 includes the lens 1 and several mirrors 7, 8, 9 and 10, and it should be understood that it also includes a lamp, though it is not shown specifically in FIG. 4. Accordingly, in the present exposure optical unit, the mirrors 7–10 and the lamp ( not shown ) are movable elements. The original position of each of the mirrors 7–10 is indicated by the solid line and its advanced position is indicated by the dotted line, and each of these mirrors 7-10 moves from the original position indicated by the solid line to the advanced position indicated by the dotted line during slit-exposing operation at constant speed. Upon completion of slit-scanning operation, each of the mirrors 7-10 is returned to the original position to be set ready for the next exposure operation. It is to be noted that the lamp (not shown) moves integrally with the mirror 7.

In the arrangement shown in FIG. 4, that portion of the light path extending between the mirrors 8 and 9, when located at the positions indicated by the solid lines, remains fixed in spaced irrespective of the fact that the mirrors 7-10 are moved in the exposure or return mode. Therefore, in the arrangement of FIG. 4, it is most preferable to provide the exposure control unit 6 located in the region defined by that portion of the light path because such a structure allows to provide the exposure control unit 6 stationarily in space.

It is to be noted, however, that even that portion of the light path which remains fixed in space during normal slit-scanning and returning operation will shift in position when the magnification ratio is varied. Thus, in the case of a slit-scanning type image exposing system capable of varying its magnification ratio, the exposure control unit 6 must be so provided that it changes its position in accordance with the selected magnification ratio. However, this is not a problem since such changes in position of the exposure control unit 6 are rather static in nature and no synchronizing mechanism is necessary. In other words, once the exposure control unit 6 is set at a position corresponding to the selected magnification ratio, the unit 6 may remain fixed in position during exposure and returning operations.

Figure 5:
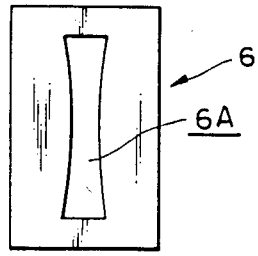
FIG. 5 is a plan view showing one embodiment of the exposure light amount control unit 6 which may be employed in the present system.

In general, a lens such as the lens 1 follows the cosine fourth power law. Thus, even if the original image 0 is uniformly illuminated in intensity in the direction perpendicular to the moving direction of the photosensitive member 2, when the thus illuminated original image 0 is slit-exposed to the photosensitive member 2, the intensity of the slit-exposed light received by the photosensitive member 2 is not uniform in the longitudinal direction of the slit, or the direction perpendicular to the moving direction of the member 2. The light intensity tends to be lower on both ends of the slit as compared with the middle. Under the condition, in order to make the amount of slit-exposed light received by the photosensitive member 2 uniform along the longitudinal direction of the slit, the slit plate 6 may be so structured to have a slit 6A which is made gradually wider toward its ends, as shown in FIG. 5, when the slit plate 6 is to be applied to the exposure control unit of the type shown in FIG. 4. The slit plate 6 of FIG. 5 is thus effective not only in making the slit-exposed light uniform in intensity along the longitudinal direction of the slit 6A, but also in preventing stray light from reaching the photosensitive member 2.

Figure 6:
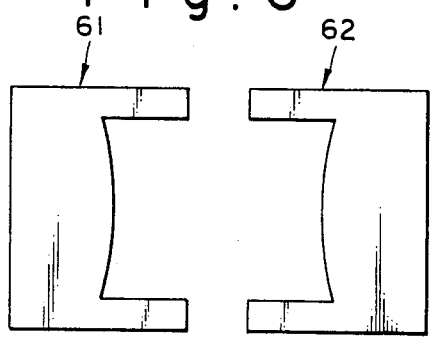
FIG. 6 is a plan view showing another example of the two-piece exposure light amount control unit which may be employed in the present system.
Figure 7:
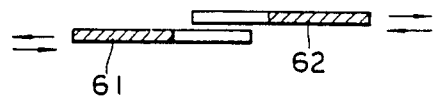
FIG. 7 is a schematic illustration showing the manner of operation of the two-piece exposure light amount control unit shown in FIG. 6.
Figure 8:
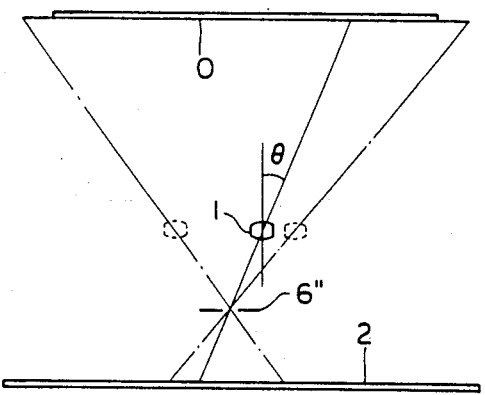
FIG. 8 is a schematic illustration showing the angular relation between the light path defined between the original image 0 and the photosensitive member 2 and the optical axis of the lens 1 in the slit-scanning type image exposing system of the present invention.

FIG. 6 shows a further modification of the exposure control unit 6 which is comprised of a pair of slit segments 61 and 62, which may be moved closer together or away from each other, as indicated in FIG. 7. Although not shown specifically, it is well known in the art to provide a mechanism for moving the slit segments 61 and 62, or one of the segments 61 and 62 with respect to the other, using such a means as wire. Such a structure allows to control the amount of exposure light to impinge upon the photosensitive member 2 more finely.

Figure 9:
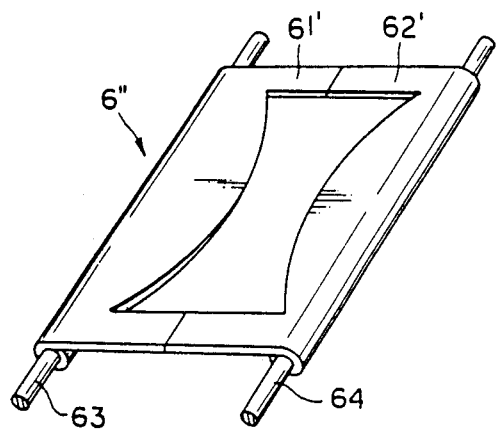
FIG. 9 is a perspective view showing a further embodiment of the exposure amount control unit 6" which may be employed in the present system.
Figure 10:
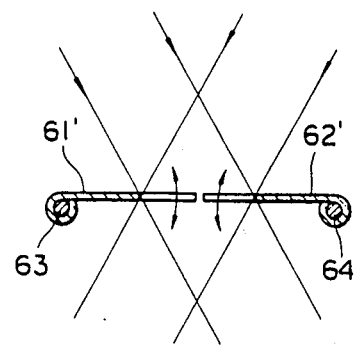
FIG. 10 is a schematic illustration showing the manner of operation of the unit 6" shown in FIG. 9.

On the other hand, in the case of an exposure optical unit of the type shown in FIG. 1, the angle θ formed between the slit-exposed light path and the optical axis of the lens 1, or the vertical line with respect to the surface of the original image 0, varies continuously as the slit-exposure operation proceeds. Becaues of this, the amount of the slit-exposed light received by the photosensitive member 2 also changes in the moving direction of the member 2. Thus, in order to eliminate the changes in the amount of slit-exposed light due to changes in the angle θ, use may be made of an exposure control unit 6″ shown in FIG. 9. As shown, the unit 6″ includes a pair of pivotally supported slit segments 61′ and 62′, which are fixedly supported by a pair of shafts 63 and 64, respectively. As shown in FIG. 10, the slit segments 61′ and 62′ are suitably pivoted around the axes of the shafts 63 and 64 depending upon variation in the incident angle θ, so that the size of the slit defined by the pair of slit segments 61′ and 62′ may be appropriately changed to eliminate the effect of changes in the incident angle θ.

Referring back to FIG. 1, the slit-exposing operation is completed when the lamp 3 reaches the position indicated by the dotted line. Then, the system enters into the returning mode and the lamp 3 starts to go back to the original position indicated by the solid line. Upon entering into this returning mode, the lamp 3 is extinguished. However, since such a lamp as the lamp 3 which is used for illuminating the original image 0 is rather large in capacity, producing high intensity of light, the amount of light emitted from the lamp 3 does not drop to zero immediately upon disconnection of current supply thereto. There is usually a transitional period and thus the amount of emitted light, in fact, drops to zero after elapsing a certain period of time upon turning off. As a result, during the returning mode upon completion of slit-exposure operation, there may be produced stray light, which could adversely affect the latent image formed on the photosensitive member 2.

Figure 11:
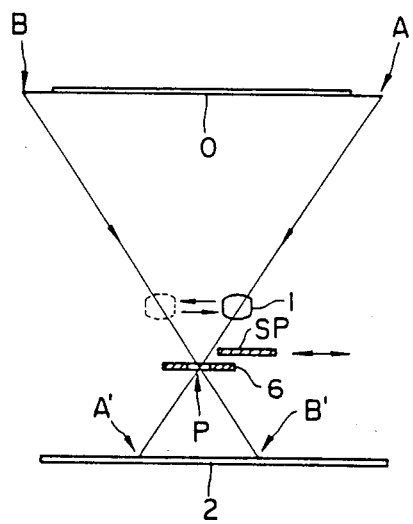
FIG. 11 is a schematic illustration showing another embodiment of the present slit-scanning type image exposing system in which a shutter member SP is provided for temporarily closing the light path between the original image 0 and the photosensitive member 2 while the exposure optical unit is being restored to its original condition.

FIG. 11 shows one embodiment of the present slit-scanning type image exposing system which is addressed to solve the above-described problem. As shown, the overall structure is very similar to that of FIG. 3 and, in addition, there is provided a shutter member SP which is movable between the advanced position where the shutter member SP obstructs the transmission of light toward the photosensitive member 2 and the retracted position which is defined at the location away from the light path. As is obvious, it is so controlled that the shutter member SP is positioned at the retracted position during the exposure mode; whereas, it is positioned at the advanced position during the returning mode, as indicated by the double-sided arrow. Since any means for controlling the position of the shutter member SP, known to those skilled in the art, may be used for this purpose, it will not be described in detail here.

Figure 12:
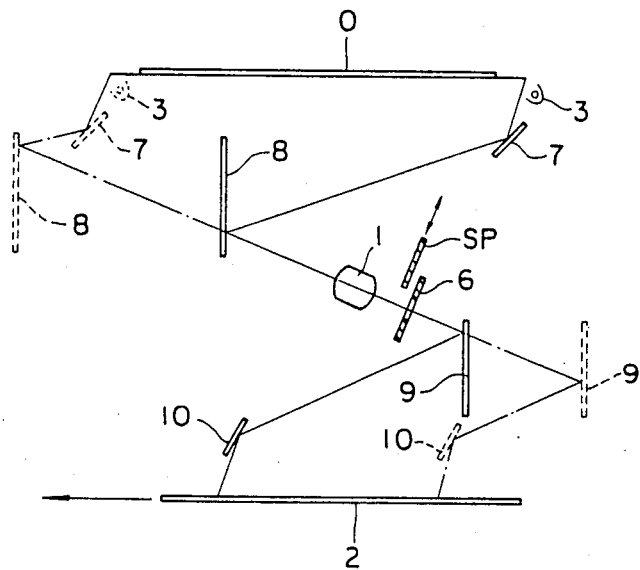
FIGS. 12 through 14 are schematic illustrations showing alternative embodiments of the present system including the shutter member SP when applied to different types of exposure optical units.

FIG. 12 shows a further embodiment of the present invention, whose exposure optical unit includes the lens 1, lamp 3, and mirrors 7-10, which are all movably provided. This arrangement corresponds to that of FIG. 4, but there is additionally provided the shutter member SP, which may be moved into the advanced position to block the passage of light toward the photosensitive member 2. As mentioned previously with respect to the disposition of the exposure optical unit 6, it is preferable to provide such a shutter member SP in the region where the light path of slit-exposed light remains fixed in space. For example, the shutter member SP is provided in the region of the stationary light path extending between the mirrors 8 and 9. The expanse of movement of the shutter member SP may be minimized with such an arrangement.

Figure 13:
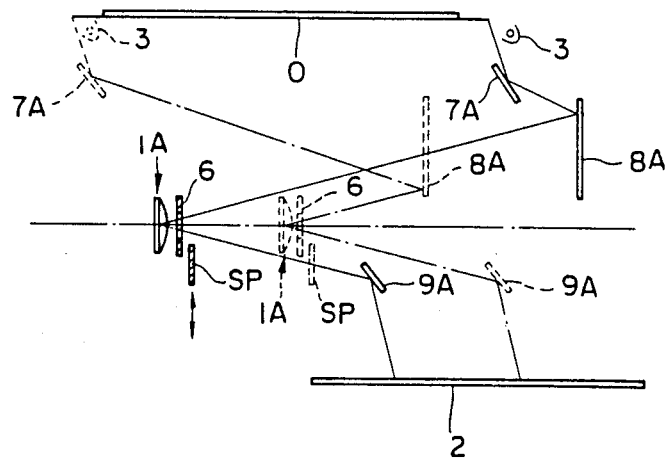

FIG. 13 shows a further embodiment of the present invention, the exposure optical unit of which comprises an in-mirror lens 1A, lamp 3 and mirrors 7A, 8A and 9A, which are all movable and move toward the advanced positions indicated by the dotted lines from the original positions indicated by the solid lines during exposure mode. The in-mirror lens 1A, slit plate 6 and shutter member SP are integrally provided, and the shutter member SP is movable with respect to the slit plate 6 and the in-mirror lens 1A, so that the shutter member SP may be so positioned to block passage of light or to allow passage of light toward the photosensitive member 2.

Figure 14:
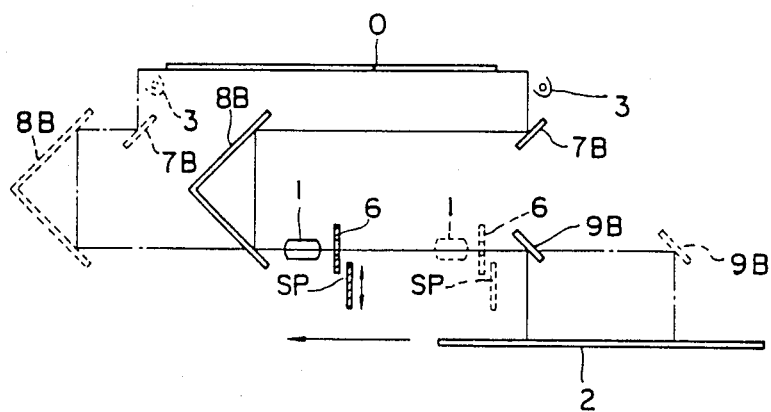

FIG. 14 shows a still further embodiment of the present invention, and its exposure optical unit includes the lens 1, lamp 3, mirrors 7B and 9B and dach-mirror 8B, as movable elements. In this case also, the lens 1, slit plate 6 and shutter member SP are provided as a unit, and the shutter member SP is movable with respect to the lens 1 and slit plate 6, so that the shutter member SP may move into or more out of the light path toward the photosensitive member 2. This three-piece unit is also moved in parallel with the photosensitive member 2 in association with the other moving parts of the exposure optical unit in either of the exposure and returning modes. It is to be noted that the shutter member SP may be provided to be movable in any desired manner. For example, it may be provided rotatably, pivotally, or translationally.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An exposing system for slit-exposing an original image placed in a stationary frame of reference to a photosensitive member, which is placed substantially in parallel with said original image and is being moved in a predetermined direction with respect to said original image at constant speed, said system comprising:

an exposure optical unit including focusing means for focusing at least a part of said original image onto said photosensitive member, said focusing means being reciprocatingly moved between respective first and second positions, thereby moving a slit-scanned image portion formed on said photosensitive member in the direction opposite to the moving direction of said photosensitive member with respect to said stationary frame of reference during slit-exposure operation, whereby a substantially stationary point of a light path between said original image and said photosensitive member is defined in between and spaced apart from said focusing means and said photosensitive member; and an exposure control unit disposed at said stationary point for controlling the passage of light from said original to said photosensitive member through said exposure optical unit.

2. A system of claim 1 wherein said photosensitive member is uniformly charged and an electrostatic latent image corresponding to said original image is formed on said photosensitive member as a result of the image exposure.

3. A system of claim 1 wherein said exposure control unit comprises a slit plate which has a defined shape and which is provided with a slit of a predetermined shape.

4. A system of claim 3 wherein the width of said slit is made gradually wider toward both ends from the middle along its longitudinal direction.

5. A system of claim 3 wherein said slit plate includes at least two segments which are movable to change the size of the slit defined between the segments.

6. A system of claim 5 wherein said slit plate segments are translationally movable.

7. A system of claim 5 wherein said slit plate segments are pivotally movable in association with the incident angle of the slit-exposed light into said lens.

8. An exposing system for slit-exposing an original image placed in a stationary frame of reference to a photosensitive member, which is placed substantially in parallel with said original image and is being moved in a predetermined direction with respect to said original image at constant speed, said system comprising:

an exposure optical unit including focusing means for focusing at least a part of said original image onto said photosensitive member, said focusing means being reciprocatingly moved between respective first and second positions, thereby moving a slit-scanned image portion formed on said photosensitive member in the direction opposite to the moving direction of said photosensitive member with respect to said stationary frame of reference during slit-exposure operation, whereby a stationary point of a light path between said original image and said photosensitive member is defined in between and spaced apart from said focusing means and said photosensitive member and shutter means disposed in the vicinity of said stationary point for temporarily closing the light path defined between said original image and said photosensitive member through said exposure optical unit while said exposure optical unit returns to its original position upon completion of slit-exposure operation.

9. A system of claim 8 further comprising an exposure control unit disposed at said stationary point for controlling the passage of light from said original image to said photosensitive member through said exposure optical unit.

* * * * *